A. M. CORSON.
MEASURING AND DISPENSING DEVICE.
APPLICATION FILED JAN. 2, 1920.
1,411,990. Patented Apr. 4, 1922.
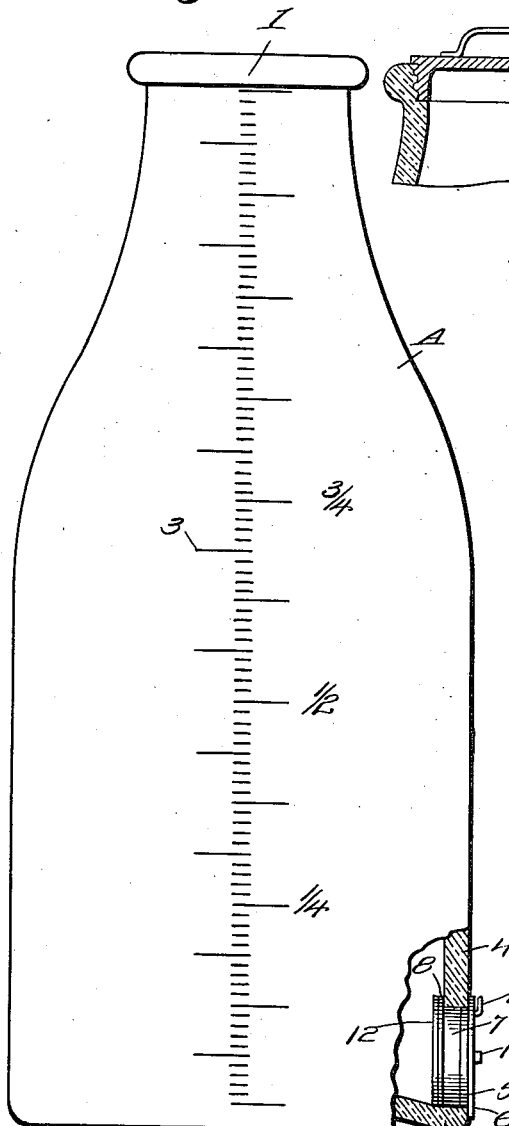
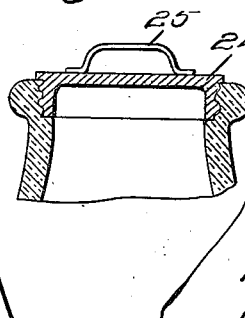
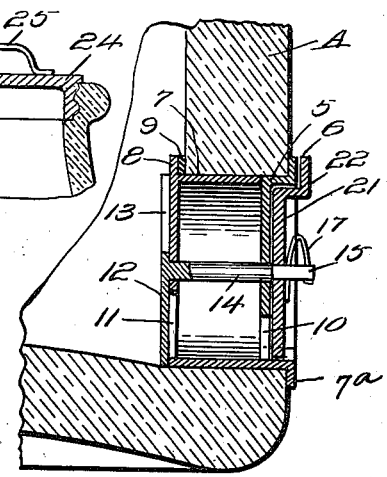
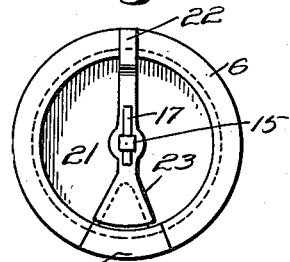
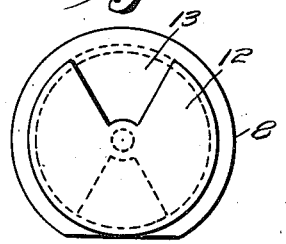
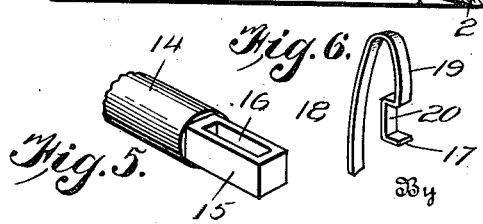
Inventor
A. M. Corson
By Geo. P. Kimmel
Attorney

UNITED STATES PATENT OFFICE.

ALFRED MEARLE CORSON, OF MADISON, MAINE.

MEASURING AND DISPENSING DEVICE.

1,411,990. Specification of Letters Patent. Patented Apr. 4, 1922.

Application filed January 2, 1920. Serial No. 348,847.

*To all whom it may concern:*

Be it known that I, ALFRED MEARLE CORSON, a citizen of the United States, residing at Madison, in the county of Somerset and State of Maine, have invented certain new and useful Improvements in a Measuring and Dispensing Device, of which the following is a specification.

This invention relates to bottles and primarily to that class of bottles wherein a scale is provided for indicating the quantity of contents and having incorporated therewith means for drawing off certain predetermined quantities of the contents.

In accomplishing the principal objects of the present invention the structural features in general terms contemplate the provision of a bottle having a graduated scale and a manually operated outlet faucet for drawing off certain predetermined quantities of the contents thereof.

In order to facilitate a clear understanding of the invention it is pointed out that milk, or for that matter other fluids, contain light and heavy ingredients which upon settling separate into distinct layers. In the case of milk the cream rises to the top and the milk may be removed from the bottom of the receptacle by such a tap or faucet as the present invention provides, and furthermore the quantity of cream in a given quantity of milk can be measured as well as other ingredients such as water and the like used to dilute or adulterate it. Consequently, a person using the bottle contemplated by the present invention can ascertain at a glance the richness of the milk or other beverage contained therein.

Furthermore after churning, the contents of the churn may be returned to the bottle and the quantity of butter fat ascertained.

And also, the objects of the present invention may be supplemented by stating that the bottle contemplated in the present invention may also be used to advantage by druggists, particularly to contain fluid which upon settling separate into distinct layers, and for drawing off in succession each of the layers into smaller and separate bottles.

With these objects in view and others which will appear as the nature of the invention is better understood, the invention comprises various novel features of construction and arrangement of parts, which will be more fully described hereinafter and set forth with particularity in the claim appended hereto.

In the drawings wherein is illustrated the preferred embodiment of the invention, Figure 1 is a side elevation of the bottle partly in section to show the valve or faucet used in connection therewith, and also showing to advantage the scale or graduation.

Figure 2 is an enlarged detail sectional view of the valve or faucet used in connection with the embodiments shown in Figure 1.

Figure 3 is a front view of the valve or faucet.

Figure 4 is a rear view of the valve or faucet.

Figure 5 is an enlarged detail perspective view of the valve shank.

Figure 6 is an enlarged perspective view of the spring used in connection with the valve or faucet shank.

Figure 7 is a view of a top embodied in a slight modification of the bottle.

In the drawings like characters of reference indicate like or similar parts throughout the several views.

A designates a bottle preferably formed of clear glass, and having a beaded top 1 and the usual paper cover (not shown). Extending from the bead 1 to the bottom 2 of the bottle are a series of graduations 3 from which may be ascertained either the exact quantity of the contents of the bottle or the quantity of contents contained in separate layers—for instance cream and milk. Formed in the side wall 4 of the bottle adjacent the bottom 2 is an opening within which is received a valve housing comprising a shallow tubular outer section 5 closed at its inner end except for a central opening and a segmental or triangular outlet opening 10 and flanged as at 6 throughout the greater portion of its perimeter, said flange 6 extending from one side to the other of said opening 10; and an inner tubular section 7 closed at its inner or rear end and flanged as at 8 and between which flange 8 and the wall 4 is rubber gasket 9. The housing section 7 is also provided with a triangular or segmental opening 11 through which the fluid passes and which registers with opening 10 in section 5 for this purpose. The outer end of section 7 is provided with an out-turned pouring lip 7ª adapted to fit between the ends of flange 6 of section 5 (see Fig. 3) and assists in retaining section 7 in operative position.

A revoluble inner plate or disk valve 12 having a port 13 adapted to be turned to register with the opening 11 is mounted on the rear or inner end of the housing section 7 and has a shank 14 extending through openings provided therefor in the ends of the housings and terminating exteriorly of the closed ends of outer section 5 in a squared end 15 having a longitudinal slot 16 for receiving a spring member 17 bent upon itself to form arms 18 and 19; the arm 19 being bent as at 20 to engage the walls of the slot 16 to securely hold the spring in place.

Mounted upon the squared end 15 of the shank 14 between the spring member 17 and the outer housing section 5 is a valve member 21 having an arm 22 bent to extend over the flange 6 to provide a finger grip, and terminating at its opposite end in a triangular enlarged plate valve member 23 for closing the opening 10.

As the valve member 21 is mounted upon the squared shank 15 rotation thereof will also rotate the plate valve 12 to uncover the opening 11 thus permitting fluid to pass out of the bottle.

In the modification shown in Figure 7 the usual paper cap (not shown) is replaced by a metallic cover (preferably aluminum) having a screw threaded body 24 for engaging internal screw threads in the bottle neck, and a hand grip or handle 25. If desirable a vent may be provided in the cap to facilitate passage of fluid from the bottle without moving the same.

As the heaviest fluids settle to the bottom it is evident that they may be drawn off in layers and that their quantity may be ascertained beforehand or at the same time through the medium of the gauge 3 in the manner before described.

It is obvious that those skilled in the art may vary the details of construction and arrangement of parts without departing from the spirit of my invention, and therefore I do not wish to be limited to such features except as may be required by the claim.

What I claim is:

The combination with a receptacle having an opening in one wall, of a valve housing in the opening comprising an annular inner section of a length corresponding substantially to the thickness of the wall of the opening and having an outturned annular flange, a rubber gasket arranged between said flange and the wall of the receptacle around said opening, an outer section mounted in said opening and having an outturned flange engaging the outer face of said receptacle, each of said housing sections being provided with a triangular opening, the opening in one section registering with that in the other to provide an outlet for the contents of the receptacle, an inner plate valve having a port to register with the opening in the inner section of the housing, said plate having a shank extending through the end walls of the housing and projecting beyond that of the outer section, said projecting end having a slot, a spring member mounted in said slot, and a valve member mounted upon said shank end between the spring member and the outer housing section, said valve member having an arm bent to extend over the flange of the outer section to provide a finger grip terminating at its opposite end in a triangular enlarged plate valve for closing the opening in the outer housing section.

In testimony whereof, I affix my signature hereto.

ALFRED MEARLE CORSON.